Nov. 1, 1960 H. M. ROBBINS ET AL 2,958,852

DIODELESS MAGNETIC SHIFTING REGISTER

Filed March 28, 1956 2 Sheets-Sheet 1

HAROLD R. KAISER,
HOWARD M. ROBBINS,
INVENTORS

BY [signature]
ATTORNEY

Nov. 1, 1960 H. M. ROBBINS ET AL 2,958,852

DIODELESS MAGNETIC SHIFTING REGISTER

Filed March 28, 1956 2 Sheets-Sheet 2

HAROLD R. KAISER,
HOWARD M. ROBBINS,
INVENTORS

BY [signature]

ATTORNEY

United States Patent Office 2,958,852

Patented Nov. 1, 1960

2,958,852

DIODELESS MAGNETIC SHIFTING REGISTER

Howard M. Robbins, Los Angeles, and Harold R. Kaiser, Woodland Hills, Calif., assignors to Hughes Aircraft Company, Culver City, Calif., a corporation of Delaware Filed Mar. 28, 1956, Ser. No. 574,399

11 Claims. (Cl. 340—174)

Figure 1:
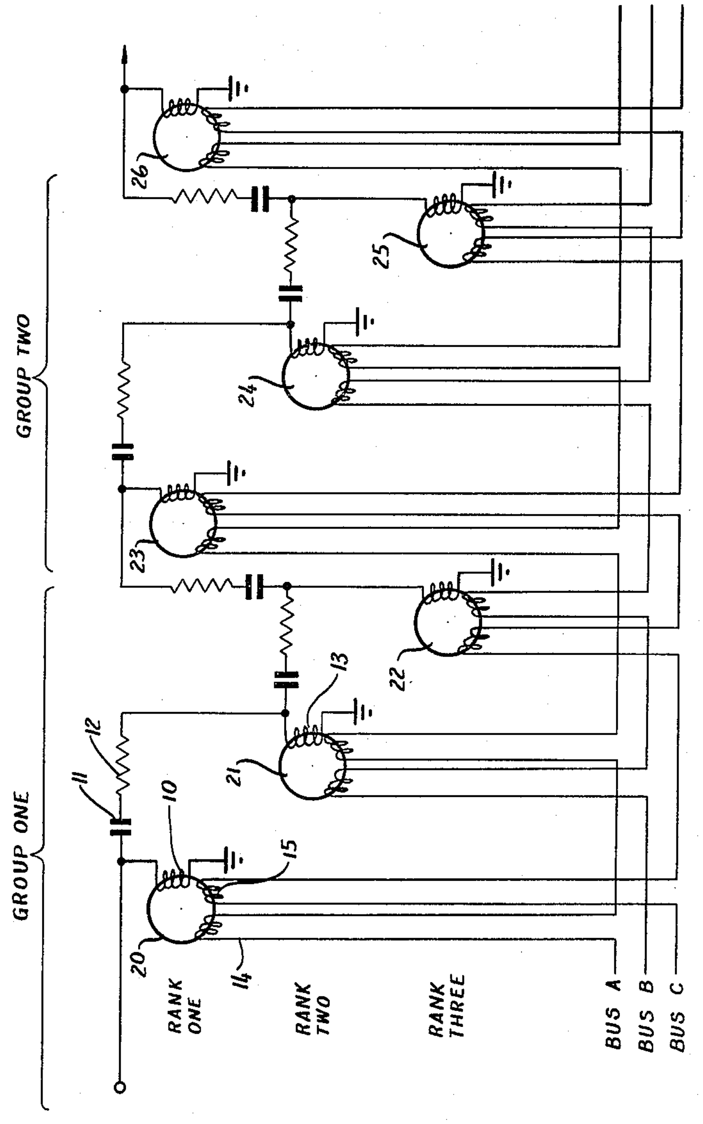

The present invention relates to a shift register utilizing magnetic binaries, and more particularly to such a shift register which includes only bilateral circuit elements.

The use of shifting registers which are capable of storing information in binary form, and of selectively shifting it in response to applied control signals, is now well known in the computation and control arts. Inasmuch as magnetic binaries are very small, inexpensive, and reliable, they have received increasingly wide usage as a basic memory element in these shifting registers. A typical form of a magnetic binary is, for example, a toroidal core composed of saturable magnetic material.

In magnetic shift registers it is the prevailing practice to use one or more unidirectional elements such as diodes for the purpose of directionalizing the flow of information. Since diodes or other unidirectional elements have a high initial cost and are not particularly reliable in operation, it is desirable to have a magnetic shifting register which uses no diodes.

It is, therefore, an object of the present invention to provide a magnetic shift register which uses no diodes.

Another object of the invention is to provide a magnetic shift register having a bidirectional operation such that the information can be shifted in either direction by applying appropriate control signals.

Reference is made to a copending patent application entitled, "Coupling Circuit for Magnetic Binaries," filed on February 16, 1956, Serial No. 566,042, by Harold R. Kaiser, and which is assigned to the same assignee as the present application. The Kaiser application fully describes and claims a coupling circuit for magnetic binaries which permits a bidirectional transfer of information between adjacent magnetic binary elements and which uses no diodes. The coupling circuit described and claimed in the Kaiser application is utilized as an essential part of the shift register of the present invention.

Insofar as the present application is concerned, the significant features of the preferred embodiment of the Kaiser invention are as follows. The basic structure includes first and second magnetic binary elements each capable of assuming either a remanent magnetic state representing binary 1 or a remanent magnetic state representing binary 0. First and second signal windings having substantially equal numbers of turns are magnetically coupled to said first and second elements, respectively. An electrostatic storage device in the form of a capacitor is coupled between the windings to provide a closed circuit which further includes sufficient resistance to be nonoscillatory. If a binary digit stored in the first magnetic binary element is to be shifted into the second element, then the first element stores either a binary 1 or 0 and the second element must be pre-set to binary 0. Structural means are provided for applying a shift current pulse to the first magnetic binary element. Upon the application of the shift pulse, the first magnetic binary becomes set to the 0 state and the second magnetic binary, after a time delay corresponding to charge and discharge of the storage device, in this instance the capacitor, assumes the state previously occupied by the first magnetic binary element. A complete transfer in either direction of the remanent magnetic flux state may be achieved simply by a proper selection of circuit values and by applying a shift current pulse of sufficient time duration and energy content, despite the fact that the two signal windings have substantially equal numbers of turns.

According to the present invention a plurality of magnetic binary elements are arranged in cascade, and each adjacent pair of elements coupled together by means of a coupling circuit of the type disclosed in the Kaiser application including the electrostatic storage device. With particular reference to first, second, third, and fourth magnetic binary elements of the series or cascade arrangement, assuming that a binary digit is stored in the second element and that the first, third, and fourth elements are in the 0 state, then shift current pulses are simultaneously applied to the first and fourth magnetic binary elements in order to maintain them in the 0 state and to the second magnetic binary element to set it to the 0 state. The binary digit previously stored in the second element is therefore transferred into the third element and at the same time is precluded from being reflected back into the first element or forward into the fourth element. Thus, according to the present invention, there is provided a magnetic shifting register which requires three magnetic binary elements per binary digit of information to be stored.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only, and is not intended as a definition of the limits of the invention.

Figures 2A, 2B, 2C:
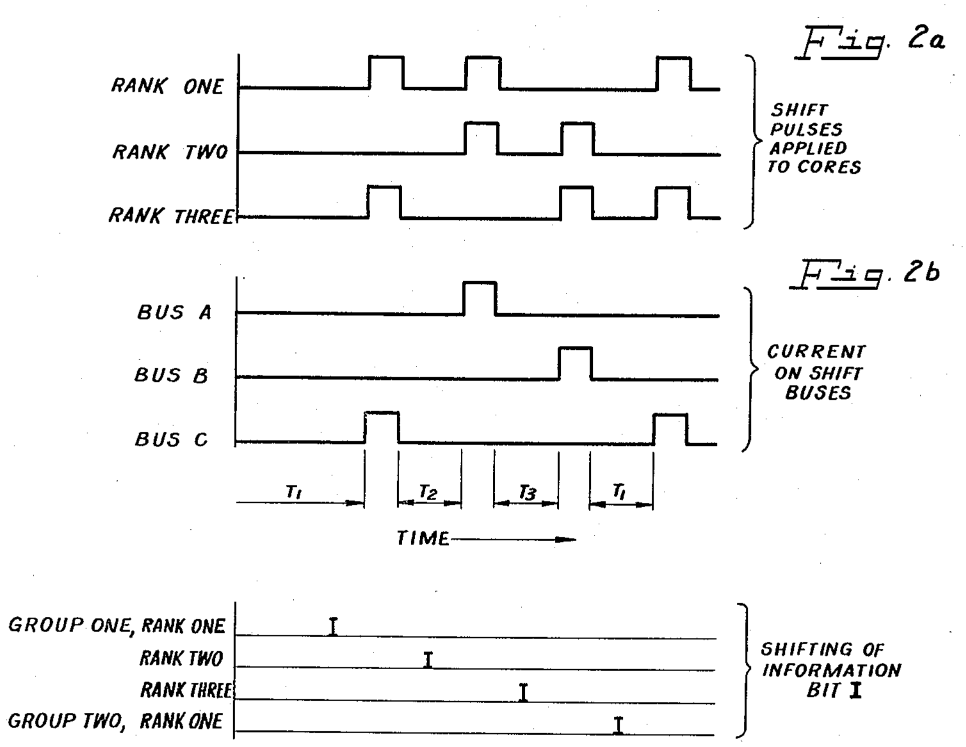

Fig. 1 illustrates in schematic form a magnetic binary shift register as provided by the present invention;

Fig. 2*a* illustrates the time relationships for the application of shift pulses to the magnetic binary elements of Fig. 1;

Fig. 2*b* illustrates the time relationships for the application of shift current pulses to the shift lines or busses of the circuit of Fig. 1; and Fig. 2*c* illustrates the manner in which a stored binary digit is shifted along the register as a function of time.

Reference is now made to Fig. 1 illustrating a preferred embodiment of the magnetic shift register provided by the present invention. The shift register of Fig. 1 comprises a series of toroidal magnetic cores 20–26, each adjacent pair of cores being coupled together by means of a coupling circuit of the type described in the copending Kaiser application. Thus, for example, cores 20 and 21 have signal windings 10 and 13 respectively magnetically coupled thereto, one end of each signal winding being connected to ground and the other ends being interconnected through an electrostatic storage device shown as a capacitor 11 and a resistor 12 to provide a closed loop circuit.

Each magnetic core has first and second shift windings magnetically coupled to it, for example, core 20 has a first shift winding 14 and a second shift winding 15. Shift busses A, B and C are provided for supplying shift current pulses to the shift windings. Bus A is connected in series with the first shift winding of each of cores 20, 23, and 26, and the second shift winding of each of cores 21 and 24. Bus B is connected in series with the first shift winding of each of cores 21 and 24 and the second shift winding of each of cores 22 and 25. Bus C is connected in series with the first shift winding of each of cores 22 and 25 and the second shift winding of each of cores 20, 23, and 26.

In operation, three magnetic cores of the series are required for the storage of each binary digit of information. Thus, in Fig. 1 cores 20—22 are collectively designated as group one and cores 23—25 are collectively designated as group two. The positions of the various cores within their respective groups are indicated as rank one for cores 20, 23 and 26; rank two for cores 21 and 24; and rank three for cores 22 and 25.

The manner of shifting information through the register is generally described as follows. At a particular time the state of core 20 may represent a first binary digit of information; the state of core 23 may represent a second binary digit of information; the state of core 26 may represent a third binary digit of information; and all of the other cores will be set to the 0 state. In other words, at any given time information signals will be stored in one of the ranks of cores but the other two ranks of cores will be in the 0 state. Upon the application of a shift pulse the information advances by one rank of cores. An information shift corresponding to one binary digital position therefore requires the application of three successive shift pulses, in order to advance the information by three ranks of cores.

Reference is now made to Fig. 2*a* illustrating the time pattern in accordance with which shift pulses are applied to the cores of ranks one, two, and three, respectively, in the shift register of Fig. 1. It will be noted from Fig. 2*a* that upon each occurrence the shift pulse is applied to two of three ranks of cores, more particularly, the shift pulse is applied to the rank of cores in which information is then stored for the purpose of shifting the information out, and is simultaneously applied to one of the other ranks of cores for determining the direction in which the information shall flow.

Reference is now made to Fig. 2*b* illustrating the time configuration in which shift current pulses are applied to busses A, B, and C of Fig. 1. It will be noted that the shift pulses are applied in a simple three-phase sequence.

Reference is now made to Fig. 2*c* illustrating the manner in which an information bit I initially stored in core 20 is shifted into core 23. It will be noted from the drawing that a time axis located between Figs. 2*b* and 2*c* indicates time intervals $T_1$, $T_2$, $T_3$, and $T_4$. Each time interval refers to a period of time between shift pulses when the stored information is consequently at rest at some specific location.

Referring more particularly to the example illustrated in Fig. 2*c*, at time $T_2$ it is necessary that the shift pulse applied to the rank one cores shall have a time duration at least as long as the time required for transfer of a stored binary digit, i.e., for a period of time corresponding to charge and discharge of each of the coupling capacitors such as capacitor 11. During $T_2$ the shift pulse applied to the cores of rank two, in which information is then stored, must have a time duration sufficient to accomplish a complete reversal of state of each of the cores of rank two. It will be noted that such a reversal actually occurs only if the core stored a binary 1.

An apparent problem arises from the fact that each time information is to be shifted, for example, out of the cores of rank two at the end of time interval $T_2$, there is a tendency for energy to flow in both directions from each core of rank two which then stored a binary 1. The shift pulse applied to the rank one cores at the end of time interval $T_2$ therefore acts to keep the cores saturated, maintaining all rank one cores in the 0 state, and thus precluding the information stored in core 21 from flowing anywhere except into core 22.

A further apparent problem is that a complete transfer of the remanent magnetic flux state from one core to the next is necessary. While using substantially equal numbers of turns on all of the signal windings such as 10 and 13, this complete transfer may nevertheless be achieved by a proper selection of circuit values and by applying a shift pulse of sufficient magnitude, time duration, and energy content to the cores in which the information is then stored.

Certain modifications of the shift register as illustrated in Fig. 1 will be readily apparent to those skilled in the art. For example, the direction of shifting of the information may be reversed simply by reversing the phase sequence of the shift pulses applied to busses A, B, and C. Another possible modification is to provide each core with only a single shift winding, supplying shift pulses to the respective ranks of cores in accordance with the configuration shown in Fig. 2*a*. A still further modification is to utilize two separate signal windings for each core, including one of the signal windings in the coupling circuit associated with the preceding core and the other in the coupling circuit associated with the following core.

What is claimed is:

1. A magnetic shift register comprising: first, second, third, and fourth magnetic binaries each capable of assuming either of two remanent states representing binary 1 and 0, respectively; a separate coupling circuit interconnecting each of said magnetic binaries with the next, each of said coupling circuits including a separate signal winding magnetically coupled to each of the two magnetic binaries associated therewith and a capacitor coupled in series circuit relationship with said signal windings to provide a closed circuit; and information shifting means including at least one clock pulse winding coupled to each magnetic binary, and operable for setting said first, second, and fourth magnetic binaries simultaneously to the remanent state representing binary 0, whereby the information previously stored in said second magnetic binary is transferred into said third magnetic binary.

2. A magnetic shift register comprising, in combination, a plurality of toroidal magnetic cores each capable of assuming either of two remanent states representing binary 1 and 0 respectively, said plurality of cores being arranged into first, second, and third ranks; a separate coupling circuit interconnecting each core of the first rank with a core of the second rank, each core of the second rank with a core of the third rank, and each core of the third rank with a core of the succeeding first rank, in such a manner as to provide a series path for shifting information signals, each of said coupling circuits including first and second signal windings respectively magnetically coupled to the associated cores, and a separate capacitor coupled in series with each of said coupling circuits interconnecting said signal windings; and means for applying shift pulses to said cores for successively simultaneously setting said first and second, said second and third, and said third and first ranks of cores to the binary 0 state, whereby a binary digit stored in one of the cores being set to 0 is thereby transferred into the adjacent core which is not being set to 0.

3. A magnetic shift register comprising: first, second, third, and fourth magnetic binaries arranged in cascade, a plurality of bidirectional coupling circuits including a capacitor connected in series circuit relationship therewith respectively interconnecting adjacent pairs of said magnetic binaries, and means coupled to said first, second, and fourth magnetic binaries for simultaneously setting said first, second, and fourth magnetic binaries to a remanent state representing binary 0, whereby the information previously stored in said second magnetic binary is transferred into said third magnetic binary.

4. A magnetic shift register comprising: at least first, second, third, and fourth magnetic binaries arranged in cascade, each of said magnetic binaries being capable of assuming either of two remanent states representing binary 1 and 0, respectively; at least first, second, and third bidirectional coupling circuits, said first coupling circuit interconnecting said first and second magnetic binaries, said second coupling circuit interconnecting said second and third magnetic binaries, and said third coupling circuit interconnecting said third and fourth magnetic binaries, each of said coupling circuits including a separate signal winding magnetically coupled to each of the associated magnetic binaries, a series capacitor coupled between said signal windings to provide a closed loop, and further including sufficient resistance to be non-oscillatory; and information shifting means including at least one clock pulse winding coupled to each magnetic binary, and operable for setting said first, second, and fourth magnetic binaries simultaneously to the remanent state representing binary 0, whereby the information previously stored in said second magnetic binary is transferred into said third magnetic binary.

5. In a magnetic shift register including first, second and third magnetic cores, each of said cores having signal windings and a shift winding coupled thereto, a plurality of transfer loops separately interconnecting said signal windings for said first and second magnetic cores and for said second and third magnetic cores, each of said loops including a different capacitor connected in series circuit relationship with said separately interconnected windings, and means for applying a shifting pulse to predetermined ones of said magnetic cores to transfer information from one of said cores to an adjacent core.

6. A magnetic shift register comprising at least three cascaded magnetic cores, each of said cores having at least a signal winding and a shift winding coupled thereto, a plurality of transfer loops interconnecting said signal windings of successive cores, each of said loops including a temporary storage device connected in series circuit relationship with said windings, said temporary storage device having a storage capacity sufficient for storing the energy generated in one of said windings of said transfer loops during a change of state of the corresponding magnetic core and being effective to transfer said temporarily stored energy to the other winding of said loop upon the change of magnetic state of said corresponding magnetic core for changing the state of the other magnetic core of said loop, and means for energizing said shift windings of each of said magnetic cores except said other core changing state in response to the energy from said storage device.

7. A magnetic shift register as defined in claim 6 wherein said temporary storage device is an electrostatic storage device.

8. In a magnetic shift register including first, second and third magnetic cores, each of said cores having at least a signal winding and a shaft winding coupled thereto, a first electrostatic storage device connected in series circuit relationship with said signal windings of said first and second magnetic cores, a second electrostatic storage device connected in series circuit relationship with said signal windings of said second and third magnetic cores, and means for simultaneously energizing at least two of said shift windings of said magnetic cores for transferring information from one of said two magnetic cores to the remaining magnetic core.

9. In a magnetic shift register as defined in claim 8 including a resistive impedance device connected in series circuit relationship with each of said connected signal windings and proportioned to prevent oscillations in the circuits thereof.

10. In a magnetic device including a plurality of magnetic cores arranged in groups of three, a signal winding and a shift winding coupled to each of said magnetic cores, a plurality of closed loop transfer circuits each intercoupling a different pair of said signal windings, a corresponding plurality of electrostatic storage devices for said transfer circuits each being connected in series circuit relationship with said pairs of signal windings, at least three shift buses each adapted to be connected to one of said shift windings in each group of three magnetic cores, and means for energizing said shift buses in a predetermined cyclic pattern wherein at least two of said shift windings in each group of three magnetic cores are energized for predetermined periods to thereby shift information from one of said magnetic cores of each of said group to said electrostatic storage device and then to the deenergized magnetic core of the group.

11. In a magnetic device as defined in claim 10 wherein said electrostatic storage device is a capacitor and said interconnected pair of signal windings have substantially the same number of turns and are magnetically oriented with respect to their individual magnetic cores to produce magnetic fluxes therein of opposite polarities.

References Cited in the file of this patent

UNITED STATES PATENTS

| | | |
|---|---|---|
| 2,652,501 | Wilson | Sept. 15, 1953 |
| 2,825,890 | Ridler | Mar. 4, 1958 |

FOREIGN PATENTS

| | | |
|---|---|---|
| 730,165 | Great Britain | May 18, 1955 |

UNITED STATES PATENT OFFICE

CERTIFICATE OF CORRECTION

Patent No. 2,958,852 November 1, 1960

Howard M. Robbins et al.

It is hereby certified that error appears in the above numbered patent requiring correction and that the said Letters Patent should read as corrected below.

Column 3, line 45, for "$T_4$" read -- $T_1$ --; column 6, line 2, for "shaft" read -- shift --.

Signed and sealed this 3rd day of October 1961.

(SEAL)
Attest:

ERNEST W. SWIDER
Attesting Officer

DAVID L. LADD
Commissioner of Patents

USCOMM-DC